March 10, 1970     E. KORZENIAUSKAS     3,499,335
ELECTRICALLY DRIVEN AIR ERECTED GYRO
Filed Feb. 12, 1968
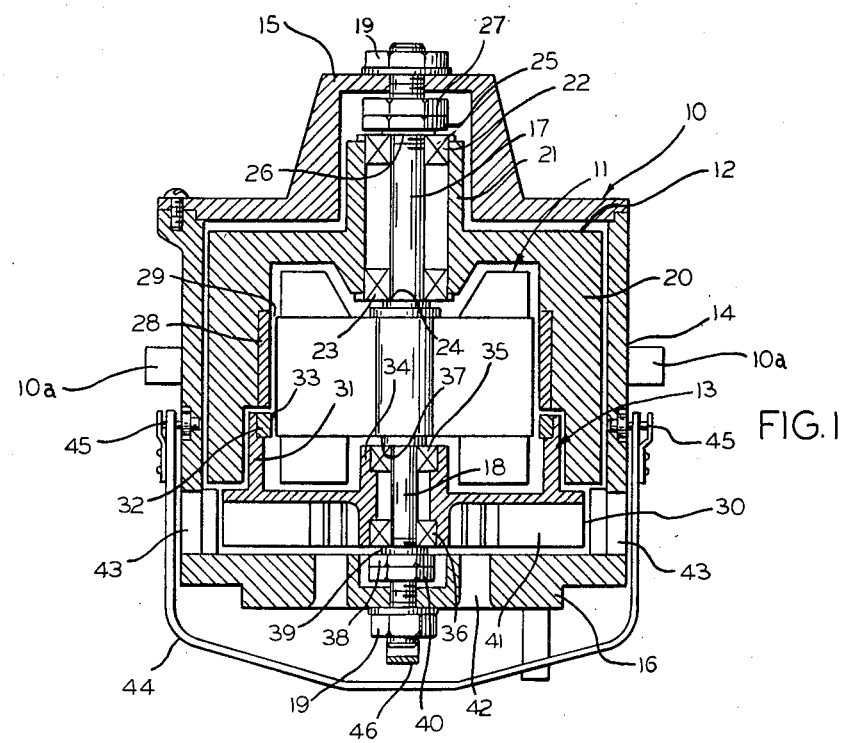
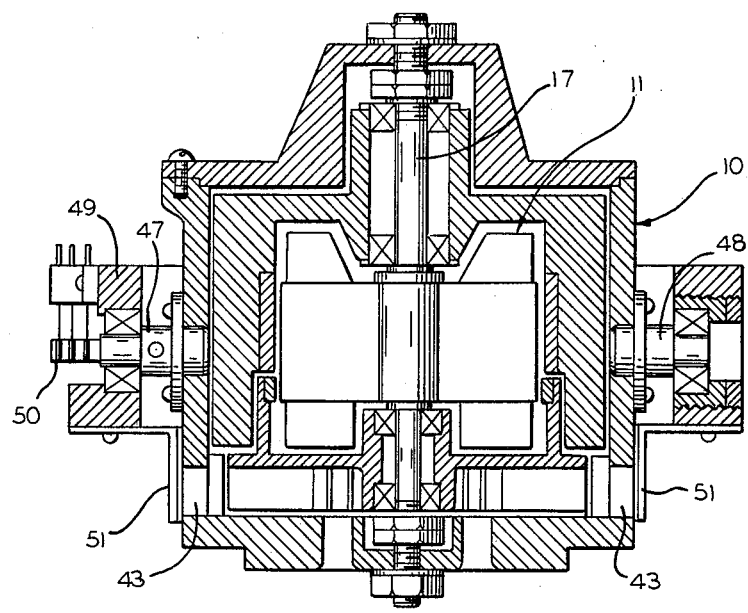
INVENTOR
EUGENE KORZENIAUSKAS
BY
*Margall, Johnston, Cook & Root*
ATTORNEY United States Patent Office 3,499,335
Patented Mar. 10, 1970

3,499,335
ELECTRICALLY DRIVEN AIR ERECTED GYRO
Eugene Korzeniauskas, Grand Rapids, Mich., assignor to R. C. Allen Business Machines, Inc., Grand Rapids, Mich., a corporation of Michigan
Filed Feb. 12, 1968, Ser. No. 704,605
Int. Cl. G01c 19/30, 19/52
U.S. Cl. 74—5.43                                         10 Claims

ABSTRACT OF THE DISCLOSURE

Gyroscopic instrument that is electrically driven and air erected. A single fixed stator is mounted in the gyro casing with shafts extending from both sides. A gyro rotor is rotatably received on one shaft and provided with a hysteresis ring that coacts with the stator to drive the gyro rotor, while a pump rotor is rotatably received on the other shaft and provided with a hysteresis ring that coacts with the stator independently of the gyro rotor to drive the pump rotor independently.

---

The gyro of the present invention overcomes the above identified difficulty by providing a gyro rotor and a pump rotor that operates independently of the gyro rotor and is of light weight. The pump rotor is capable of rapid acceleration to thereby provide rapid jet erection torques and eliminate the need for manual caging.

It is therefore an object of the present invention to provide a new and improved air erected gyro that is capable of generating rapid jet erection torques so as to eliminate the need for manual caging.

Another object of this invention resides in the provision of an electrically driven air erected gyro that includes a gyro rotor and an independently arranged pump rotor of light weight and which is capable of rapid acceleration upon initial energization of the gyro.

Still another object of this invention is in the provision of an electrically driven air erected gyro that, while being simple and compact in nature and economical to manufacture, is capable of producing rapid jet erection torques to provide quick erection response time and thereby a more accurate instrument in which the gyro is employed.

Other objects, features and advantages of the invention will be apparent from the following detailed disclosure, taken in conjunction with the accompanying sheet of drawings, wherein like reference numerals refer to like parts, in which:

FIG. 1 is an axial sectional view taken through a horizon gyro according to the present invention; and FIG. 2 is an axial sectional view taken through a directional gyro according to the present invention.

While the present invention is shown in FIG. 1 applied to a horizontal gyro and in FIG. 2 applied to a directional gyro, it is to be appreciated that it could apply to any suitable type of instrument where it is desired to employ air erecting operation along a predetermined axis. In this regard, the gyro of the present invention may apply to gyroscopes having two or three degrees of freedom, and is particularly adaptable to a free gyroscope such as a vertical gyro or gyroscope artificial horizon gyroscope such as a vertical gyro or gyroscope artificial horizon commonly employed as an attitude indicator on aircraft, or directional gyroscopes employed as course indicators. While the motor of the gyro according to the present invention may be designed to be driven by any source of power, it is contemplated that it would operate as intended if it is driven in the usual manner by a 400-cycle, 110-volt source that would provide a rotor speed of about 24,000 r.p.m. An air erected gyro like that of the present invention may be gravitationally responsive when applied to an artificial horizon application and intended to maintain the rotor axis in a predetermined position relative to the direction of the normal gravitational forces, as shown in FIG. 1, where the rotor case has oppositely disposed ports therein from which jets of air are discharged and pendulous vanes pivotally mounted on the exterior of the case intercept the air jets to produce torques that retain the erected gyro position. Similarly, the invention may be applied to a directional gyro, as shown in FIG. 2, where fixed vanes of divergent construction or a divided baffle member coact with air jets. In this embodiment, the vanes are mounted on the gimbal or frame, so that the air jet normally strikes the vanes or baffles at their division point deflecting the air jet oppositely to exert torques in either direction about the vertical axis of the gyroscope, as the frame becomes inclined in either direction, whereby the spin axis is maintained horizontal.

Referring now to the drawings, and particularly to FIG. 1, a horizon gyro is illustrated which generally includes a casing 10 defining a chamber in which is mounted a gyro stator 11, a gyro rotor 12 and a pump rotor 13, wherein the gyro stator is fixed to the casing 10 and the gyro and pump rotors are bearingly supported thereon for rotation about the axis of the stator. The casing 10 may be also defined generally as a gimbal, and particularly the inner gimbal of a gyroscopic instrument which will have gimbal mounts 10a enabling the gimbal 10 to pivot on an axis perpendicular to the rotor spin axis. The mass of the gyro rotor 12 generates the angular momentum and gimbal stability, while independently therefrom the pump rotor 13 generates the pressure for the jet erection torques which stabilizes the gyro along a predetermined axis, and usually the spin axis of the rotor.

The casing on gimbal 10 includes a cylindrical side wall 14 enclosed at its upper end by a wall member or upper end cap member 15, and enclosed at its lower end by a wall member or lower cap member 16. Suitable fastening means may be provided to fasten the cap members to the cylindrical wall 14. The upper cap member 15 is formed centrally to define a cavity for some of the internal working parts of the gyro.

The stator 11 includes oppositely extending and coaxially aligned shafts or shaft portions 17 and 18 which are also coaxial with the cylindrical wall 14 and protrude slightly through the upper and lower wall members 15 and 16. The outer ends are threaded to receive washer and nut units 19 that serve to lock the stator 11 or fix it in position relative to the casing 10.

The gyro rotor 12 within the casing 10 includes an annular mass portion 20 arranged in surrounding and concentric relationship to the stator 11, and an integral bearing receiving bushing 21 at the upper end that is concentric to the upper shaft portion 17. Bearings 22 and 23 of a suitable kind, such as a ball bearing, are press fitted into opposite ends of the bearing bushing 21 and mounted on the shaft portion 17. The bearing bushing 21 extends at its upper end into the cavity defined in the upper cover member 15 and at its lower end into a cavity defined in the upper end of the stator 11. An annular shoulder 24 is defined on the lower end of the upper shaft portion 17 against which the lower bearing 23 is abutted to enable the bearings to be preloaded by means of a nut 25 that bears against a washer 26 which engages directly against the upper bearing 22. A retaining nut 27 locks the preload nut 25 in place. The upper shaft portion 17 may be hollow to permit the placement of wires therein for connection of the stator to a suitable source of electrical energy. Thus the gyro rotor 12 is bearingly mounted to the upper shaft portion. An annular hysteresis ring or squirrel cage ring 28 is mounted on the internal face of the gyro rotor mass portion 20 to coact with the stator and define an air gap 29 therebetween. Thus energization of the stator 11 will cause operation and rotation of the gyro rotor 12.

The pump rotor 13 includes an impeller 30 and integral therewith a driving portion 31. An annular notch is provided at the lower end of the gyro rotor 12 to allow the outward extension of the driving portion 31 so that it partially surrounds in concentric relation the stator 11. A hysteresis ring or permanent magnet ring 32 is mounted on the internal face of the driving portion 31 to coact with the stator and define therewith an air gap 33. It should be here appreciated that the air gap 33 for the pump rotor need not be the same as the air gap 29 for the gyro rotor and that it may be smaller as shown to provide a faster response by the pump rotor upon energization of the stator. A bearing receiving bushing 34 is provided centrally of the pump rotor 13 and which is arranged concentric with the lower shaft portion 18 of the stator. Spaced bearings 35 and 36 are press fitted into the opposite ends of the bearing portion 34 and mounted on the shaft portion 18. A shoulder 37 is provided at the upper end of the shaft portion 18 against which the upper bearing 35 abuts. The pump rotor 13 is held in place and the bearings are preloaded by a preload nut 38 that bears against a washer 39 in engagement with the lower bearing 36. A lock or retaining nut 40 locks the preload nut 38 in place.

Pumping vanes 41 are provided on the impeller 30 which communicate at their inner inlet ends with air intake ports 42 that are defined in the bottom cover member 16. The outer or discharge ends of the impeller vanes 41 communicate with air erection ports 43 formed in the cylindrical wall 44 of the casing 10. Thus, air is pumped through the casing 10 by the pump rotor 13 where the path extends form the intake ports 42 to the air erection ports 43. The ports 43 are diametrically opposed and extend along an axis that is perpendicular to the axis of the spin rotor and to the gimbal mounting axis so as to provide air erection torques capable of stabilizing the gyro in an erect position along the rotor spin axis as dictated by gravitational response from the pendulous vanes 44. The air erecting vanes 44 are pendulously mounted to the casing or gimbal 10 at pivots 45. A second pendulous vane 46 would coact with air erection ports communicating with the discharge side of the impeller 30, which ports are diametrically aligned and along an axis perpendicular to the rotor spin axis as well as the axis of the air erection ports 43 to provide air erection along a second gimbal axis that would be perpendicular to the first gimbal axis. In general, the air erection torques generated by the air erection ports and as controlled by the air erecting vanes would produce erection of the gyro in a manner similar to that disclosed in United States Patent 3,310,987.

The embodiment of FIG. 2 as far as the invention is concerned is no different than the embodiment of FIG. 1 and therefore like parts will be given the same numerals, but the gyro here is shown as being applied for a directional gyroscope, and therefore the pick offs would differ accordingly as is well known. The mounting of the casing 10 includes opposed gimbal shafts 47 and 48 bearingly mounted in gimbal supports 49 and 50. The source of electrical power for the stator 11 is brought into the gimbal shaft 47 through slip rings 50, and then into the upper shaft portion 17 of the stator. In this embodiment, the air erecting vanes 51 are mounted on the gimbal supports 49 and 50. Otherwise, the operation of the gyro is the same as that with respect to the embodiment of FIG. 1.

It will be understood that modifications and variations may be effected without departing from the scope of the novel concepts of the present invention.

The invention is hereby claimed as follows:

1. In an electrically driven air erected gyro having at least two degrees of freedom, a gimbal, a gyro rotor rotatably mounted on said gimbal, electrical means for driving said gyro rotor including a fixed stator and a hysteresis ring or squirrel cage ring on the gyro rotor coacting with said stator, air erecting ports on said gimbal, air erecting vanes mounted on said gimbal and coacting with said air erecting ports, a pump rotor rotatably mounted on said gimbal independently of said gyro rotor and including a hysteresis ring or squirrel cage ring coacting with said stator for driving same independently of said gyro rotor, said pump rotor pumping air through said ports.

2. In an electrically driven air erected gyro having at least two degrees of freedom, a gimbal, a stator mounted on said gimbal in an enclosed casing and having shafts on opposite sides thereof, a gyro rotor bearingly mounted on one of said shafts within said casing and having a hysteresis ring coacting with said stator to drive said gyro rotor, air erecting ports in said casing, air inlet port means in said casing, air erecting vanes coacting with said air erecting ports, a pump rotor bearingly mounted within said casing on the other of said shafts to pump air from said inlet port means through said air erecting ports, said pump rotor having a hysteresis ring coacting with said stator to drive said pump rotor independently of said gyro rotor, said hysteresis rings being spaced from said stator to define air gaps therebetween.

3. An electrically driven air erected gyro as defined in claim 2, wherein a portion of the gyro rotor overlies in spaced relation a portion of said pump rotor.

4. An electrically driven air erected gyro as defined in claim 2, wherein said gyro rotor spin axis is erect and said gyro rotor is positioned in superposed relation to said pump rotor.

5. An electrically driven air erected gyro as defined in claim 2, wherein each of the bearing mounts of said rotors includes a pair of spaced bearings.

6. An electrically driven air erected gyro as defined in claim 5, wherein one bearing of each mount is positioned within confines of an end of the stator.

7. An electrically driven air erected gyro as defined in claim 4, wherein said casing is generally cylindrical and said air inlet port means is on the bottom wall thereof and said air erecting ports are on the side wall.

8. An electrically driven air erected gyro as defined in claim 2, wherein the air gap between the stator and pump rotor is smaller than the air gap between the stator and gyro rotor.

9. In an electrically driven air erected gyro having two or more degrees of freedom, a gimbal, a stator mounted on said gimbal in an enclosed cylindrical casing having top and bottom walls and a cylindrical side wall, said stator having upper and lower shafts extending from opposite ends and secured centrally within and to the casing top and bottom walls, a gyro rotor in said casing surrounding said stator and having a pair of spaced bearings mounting same on the upper shaft, a hysteresis ring on said gyro rotor coacting with said stator and defining an air gap therebetween, a pump rotor in said casing having a pair of spaced bearings mounting same on the lower shaft, said pump rotor including an impeller portion and a hysteresis ring portion in concentric coacting relation to a part of the stator and defining an air gap therebetween, opposed air erecting ports in said cylindrical casing wall aligned with said impeller and at the discharge side thereof, air intake port means in the bottom wall at the intake side of the impeller, and air erecting vanes pivotally mounted on said casing cylindrical wall coacting with said air erection ports, whereby said pump rotor pumps air through said air erecting ports to define air erection torques that coact with said vanes in erecting said gyro.

10. In an electrically driven air erected gyro as defined in claim 9, wherein the air gap between the stator and pump rotor is smaller than the air gap between the stator and gyro rotor.

References Cited

UNITED STATES PATENTS

| | | | |
|---|---|---|---|
| 1,934,774 | 11/1933 | Sperry et al. | 74—5.43 |
| 2,311,652 | 2/1943 | Esval | 74—5.43 |
| 2,780,104 | 2/1957 | Carlson et al. | 74—5.43 |
| 3,310,987 | 3/1967 | Huizinga et al. | 74—5.34 |

FRED C. MATTERN, Jr., Primary Examiner

M. A. ANTONAKAS, Assistant Examiner

UNITED STATES PATENT OFFICE

CERTIFICATE OF CORRECTION

Patent No. 3,499,335 Dated March 10, 1970

Eugene Korzeniauskas

It is certified that error appears in the above identified patent and that said Letters Patent are hereby corrected as shown below:

In the Specification, Column 1, line 23, insert the following:
--This invention relates in general to gyroscopic instruments, and more particularly to an electrically driven air erected gyro for navigational use, and still more particularly to an electrically driven air erected gyro especially useful in aircraft instruments.
--Heretofore, electrically driven air erected gyros have included a dual gyro and pump rotor as a one piece unit which has required the need for manual caging when initiating operation because of the long erection time.--;
line 55, "horizontal" should be --horizon--;
lines 62 and 63, delete "gyroscope such as a vertical gyro or gyroscope artifical horizon".

SIGNED AND
SEALED
SEP 15 1970

(SEAL)
Attest:

Edward M. Fletcher, Jr.
Attesting Officer

WILLIAM E. SCHUYLER, JR.
Commissioner of Patents